United States Patent
Kusafuka et al.

(10) Patent No.: US 12,081,726 B2
(45) Date of Patent: Sep. 3, 2024

(54) THREE-DIMENSIONAL DISPLAY DEVICE, THREE-DIMENSIONAL DISPLAY SYSTEM, AND MOVABLE OBJECT

(71) Applicant: KYOCERA Corporation, Kyoto (JP)

(72) Inventors: Kaoru Kusafuka, Tokyo (JP); Takashi Shimada, Otsu (JP); Ryo Tadauchi, Otsu (JP); Kenji Ogura, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 163 days.

(21) Appl. No.: 17/765,372

(22) PCT Filed: Oct. 1, 2020

(86) PCT No.: PCT/JP2020/037464
§ 371 (c)(1),
(2) Date: Mar. 30, 2022

(87) PCT Pub. No.: WO2021/066111
PCT Pub. Date: Apr. 8, 2021

(65) Prior Publication Data
US 2022/0345686 A1    Oct. 27, 2022

(30) Foreign Application Priority Data
Oct. 1, 2019    (JP) .................................. 2019-181616

(51) Int. Cl.
*H04N 13/31*    (2018.01)
*G02B 27/01*    (2006.01)
(Continued)

(52) U.S. Cl.
CPC ......... *H04N 13/31* (2018.05); *G02B 27/0101* (2013.01); *G02B 27/0179* (2013.01);
(Continued)

(58) Field of Classification Search
None
See application file for complete search history.

(56) References Cited

U.S. PATENT DOCUMENTS

| | | | | |
|---|---|---|---|---|
| 2013/0257928 A1* | 10/2013 | Lee | ...................... | H04N 13/305 345/697 |
| 2014/0098205 A1* | 4/2014 | Usukura | ................ | G02B 30/27 348/59 |
| 2018/0157036 A1* | 6/2018 | Choi | .................. | G02B 27/0101 |

FOREIGN PATENT DOCUMENTS

| CN | 103369335 A | 10/2013 |
|---|---|---|
| CN | 103621077 A | 3/2014 |

(Continued)

*Primary Examiner* — James M Anderson, II
(74) *Attorney, Agent, or Firm* — Procopio, Cory, Hargreaves & Savitch LLP

(57) ABSTRACT

A three-dimensional display device includes a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to two eyes of a user to allow parallax separation of the parallax image.

5 Claims, 6 Drawing Sheets

(51) Int. Cl.
  *G02B 30/32*     (2020.01)
  *H04N 13/383*    (2018.01)
  *H04N 13/398*    (2018.01)
  *B60K 35/00*     (2006.01)
  *B60K 35/21*     (2024.01)
  *B60K 35/23*     (2024.01)
  *B60K 35/81*     (2024.01)

(52) U.S. Cl.
  CPC ........... *G02B 30/32* (2020.01); *H04N 13/383* (2018.05); *H04N 13/398* (2018.05); *B60K 35/00* (2013.01); *B60K 35/211* (2024.01); *B60K 35/23* (2024.01); *B60K 35/81* (2024.01); *G02B 2027/0134* (2013.01); *G02B 2027/0187* (2013.01)

(56) References Cited

FOREIGN PATENT DOCUMENTS

| | | | |
|---|---|---|---|
| JP | 7-287196 A | | 10/1995 |
| JP | 2000-78617 A | | 3/2000 |
| JP | 2000078617 A | * | 3/2000 |
| JP | 2019-145967 A | | 8/2019 |
| WO | 2012/176445 A1 | | 12/2012 |
| WO | 2019/160160 A1 | | 8/2019 |

* cited by examiner

THREE-DIMENSIONAL DISPLAY DEVICE, THREE-DIMENSIONAL DISPLAY SYSTEM, AND MOVABLE OBJECT

FIELD

The present disclosure relates to a head-up display, a display device for a head-up display, and a movable object.

BACKGROUND

A known technique is described in, for example, Patent Literature 1.

CITATION LIST

Patent Literature

Patent Literature 1: Japanese Unexamined Patent Application Publication No. 7-287196

BRIEF SUMMARY

A three-dimensional display device according to an aspect of the present disclosure includes a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to two eyes of a user to allow parallax separation of the parallax image.

A three-dimensional display system according to another aspect of the present disclosure includes a detector that detects a position of a first eye of a user and a position of a second eye of the user different from the first eye, and a three-dimensional display device including a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to the first eye and the second eye of the user to allow parallax separation of the parallax image.

A movable object according to still another aspect of the present disclosure includes a three-dimensional display device including a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to two eyes of a user to allow parallax separation of the parallax image.

BRIEF DESCRIPTION OF DRAWINGS

The objects, features, and advantages of the present disclosure will become more apparent from the following detailed description and the drawings.

DETAILED DESCRIPTION

A display device with the structure that forms the basis of a three-dimensional (3D) display device according to one or more embodiments of the present disclosure includes a barrier defining the direction of image light. The display device with this structure projects parallax images for the two eyes of a user to provide a stereoscopic view.

The barrier blocks light to allow projection of parallax images for the two eyes of the user. A barrier with larger slits may thus cause an image intended for one eye to be unintendedly projected for the other eye.

In response to the above issue, one or more of the present disclosure are directed to a head-up display including a barrier with larger slits, a display device for a head-up display, and a movable object.

One or more embodiments of the present disclosure will now be described with reference to the drawings.

Figure 1:
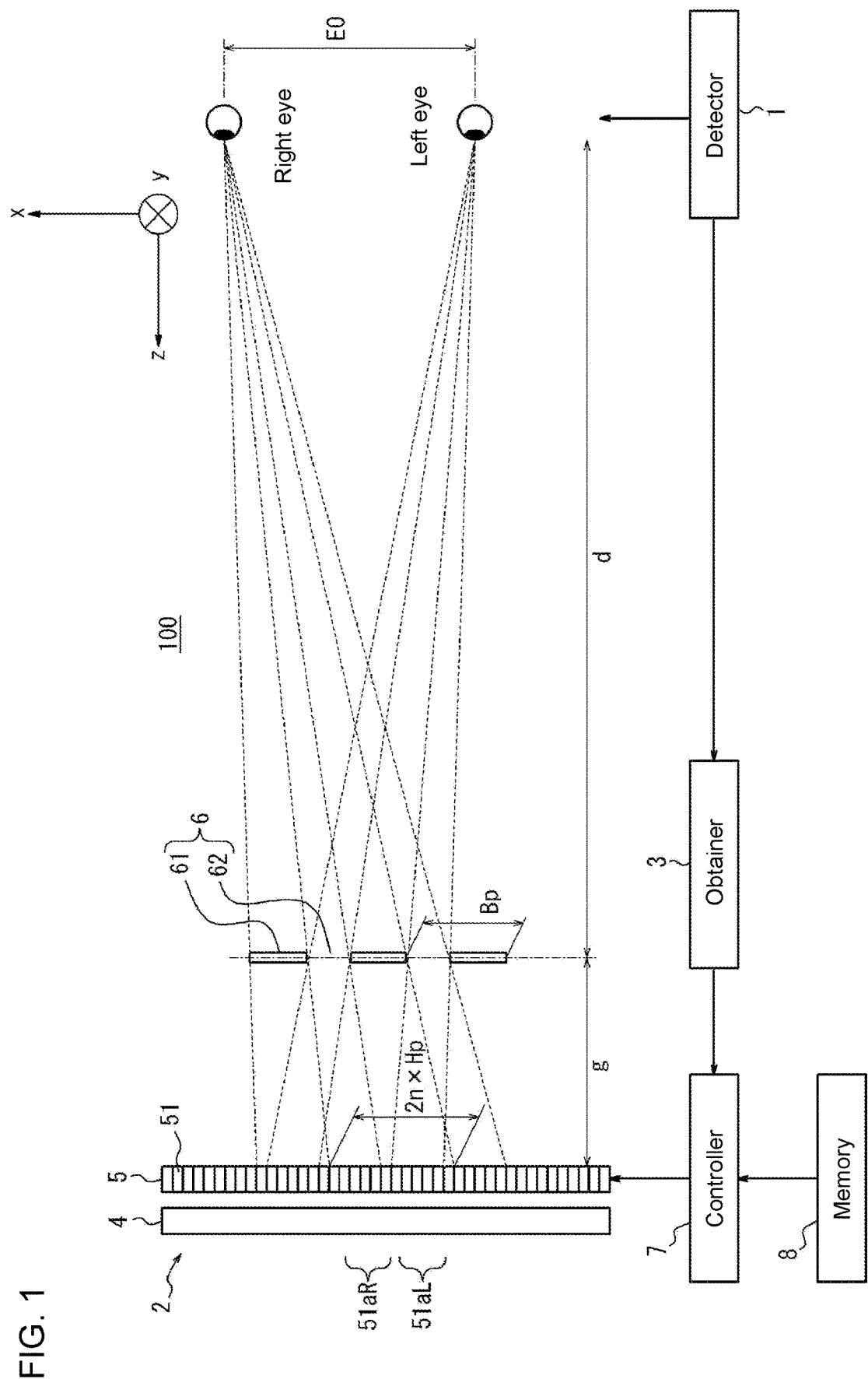
FIG. 1 is a schematic diagram of a three-dimensional (3D) display system according to an embodiment viewed in a vertical direction.

As shown in FIG. 1, a three-dimensional (3D) display system 100 according to embodiments of the present disclosure includes a detector 1 and a 3D display device 2.

The detector 1 detects the position of a first eye of the user. The detector 1 outputs information about the detected position of the first eye to the 3D display device 2. The detector 1 detects the position of a second eye of the user. The detector 1 outputs information about the detected position of the second eye to the 3D display device 2. Although the first eye is the left eye and the second eye is the right eye in the embodiments, the first eye may be the right eye and the second eye may be the left eye.

The detector 1 may include, for example, a camera. The detector 1 may capture an image of the face of the user with the camera. The detector 1 may use the image including the user's face captured with the camera to detect the positions of the left eye and the right eye. The detector 1 may use an image captured with a single camera to detect the positions of the left eye and the right eye as coordinates in a 3D space. The detector 1 may use images captured with two or more cameras to detect the positions of the left eye and the right eye as coordinates in a 3D space.

The detector 1 may not include a camera and may be connected to an external camera. The detector 1 may include an input terminal for receiving signals from the external camera. The external camera may be connected to the input terminal directly. The external camera may be connected to the input terminal indirectly through a shared network. The detector 1 that does not include a camera may include an input terminal for receiving image signals from a camera. The detector 1 including no camera may use the image signals received through the input terminal to detect the positions of the left eye and the right eye.

The detector 1 may include, for example, a sensor. The sensor may be an ultrasonic sensor or an optical sensor. The detector 1 may detect the position of the user's head with the sensor, and the positions of the left eye and the right eye based on the position of the head. The detector 1 may use one sensor or two or more sensors to detect the positions of the left eye and the right eye as coordinates in a 3D space.

The 3D display system 100 may not include the detector 1. When the 3D display system 100 does not include the detector 1, the 3D display device 2 may include an input terminal for receiving signals from an external detector connected to the input terminal. The external detector may use electrical signals or optical signals as transmission signals transmitted to the input terminal. The external detector may be connected to the input terminal indirectly through a shared network. The 3D display device 2 may receive positional coordinates indicating the positions of the left eye and the right eye input from the external detector.

The 3D display device 2 may include an obtainer 3, an illuminator 4, the display panel 5, a parallax barrier 6 as an optical element, a controller 7, and a memory 8.

The obtainer 3 can receive input information about the positions of the left eye and the right eye detected by the detector 1. The obtainer 3 can input the information about the positions of the left eye and the right eye into the controller 7.

The illuminator 4 illuminates the display panel 5 with planar illumination light. The illuminator 4 may include a light source, a light guide plate, a diffuser plate, and a diffuser sheet.

The illuminator 4 emits, from its light source, illumination light that then spreads uniformly for illuminating the surface of the display panel 5. The illuminator 4 can emit illumination light to be uniform through, for example, the light guide plate, the diffuser plate, and the diffuser sheet. The illuminator 4 may emit the uniform light toward the display panel 5.

Figure 2:
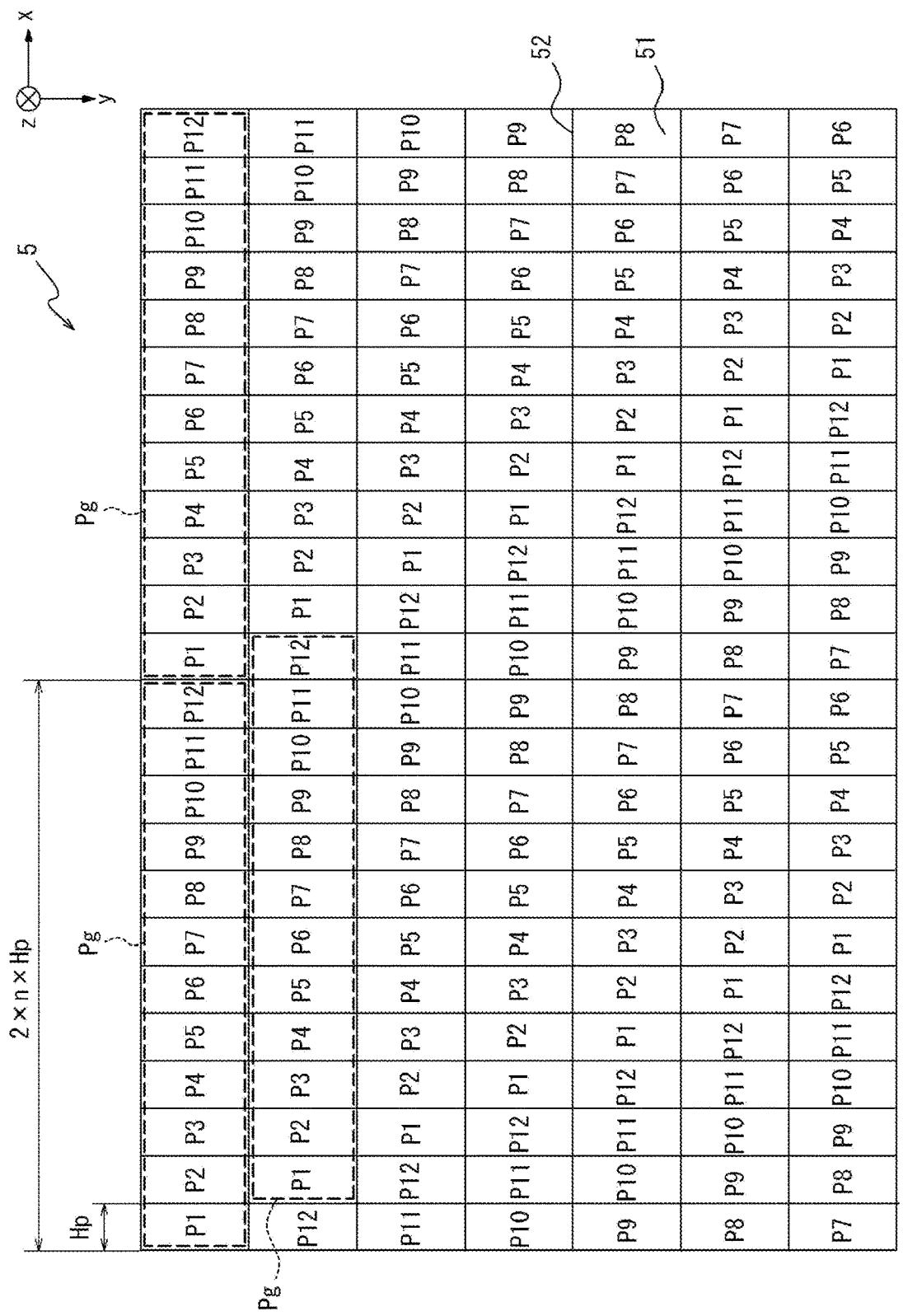
FIG. 2 is a diagram of an example display panel shown in FIG. 1 viewed in a depth direction.

As shown in FIG. 2, the display panel 5 includes a planar active area 51. The active area 51 includes multiple divisional areas. The active area 51 is operable to display a composite image. The composite image includes a first image and a second image. The second image has parallax with the first image. The first image can be a left eye image. The second image can be a right eye image. The composite image includes a third image.

The divisional areas are in a lattice-like black matrix 52 defined in a first direction and in a second direction perpendicular to the first direction. The second direction intersects with the first direction. The second direction can be substantially orthogonal to the first direction. The second direction can be orthogonal to the first direction. The first direction and the second direction define a plane. The direction perpendicular to the first direction and the second direction is referred to as a third direction. The first direction may be referred to as a horizontal direction. The second direction may be referred to as a vertical direction. The third direction may be referred to as a depth direction. However, the first, second, and third directions are not limited to the directions referred to above. In the drawings, the first direction refers to x-direction, the second direction to y-direction, and the third direction to z-direction.

Each divisional area corresponds to a subpixel. Each divisional area emits image light. The composite image includes combined image light. Thus, the active area 51 includes multiple subpixels arranged in a lattice in the horizontal direction and the vertical direction. Each first subpixel has one of the colors red (R), green (G), and blue (B). One pixel may be a set of three subpixels with R, G, and B. One pixel may include four or any other number of subpixels, instead of three subpixels. One pixel may include subpixels with a combination of colors different from R, G, and B. For example, multiple subpixels included in one pixel may be arranged in the horizontal direction. Multiple subpixels having the same color may be arranged, for example, in the vertical direction.

The display panel 5 may be a transmissive display panel. The transmissive display panel may include a liquid crystal panel. The display panel 5 is not limited to a transmissive liquid crystal panel but may be another display panel, such a self-luminous display panel. Examples of the self-luminous display panel include an organic electroluminescent (EL) display and an inorganic EL. The display panel 5 may be another display panel. For the display panel 5 being a self-luminous display panel, the 3D display device 2 may not include the illuminator 4.

As described above, the multiple subpixels arranged in the active area 51 form multiple subpixel groups Pg. The multiple subpixel groups Pg are arranged repeatedly in the horizontal direction. The multiple subpixel groups Pg are arranged repeatedly in the vertical direction at positions shifted by one subpixel or by a predetermined number of multiple subpixels from the corresponding subpixels in the horizontal direction. The subpixel groups Pg are adjacent to one another. The subpixel groups Pg each include multiple subpixels in predetermined rows and columns. In the example shown in FIG. 2, the subpixel groups Pg each include (2×n×b) subpixels P1 to P(2×n×b), which are consecutively arranged in b rows in the vertical direction and in (2×n) columns in the horizontal direction. In the example shown in FIG. 2, n is 6, and b is 1. The active area 51 includes the subpixel groups Pg each including 12 subpixels P1 to P12 consecutively arranged in one row in the vertical direction and in 12 columns in the horizontal direction. In the example shown in FIG. 2, some of the subpixel groups Pg are denoted by reference signs.

Each subpixel group Pg is the smallest unit controllable by the controller 7 to display an image. The subpixels P1 to P(2×n×b) included in each subpixel group Pg with the same identification information are controlled by the controller 7 at the same time. Being controlled at the same time includes being controlled simultaneously, substantially simultaneously, based on the same clock, and in the same frame. For example, the controller 7 can switch the image to be displayed by the multiple subpixels P1 from the left eye image to the right eye image at the same time in all the subpixel groups Pg.

As shown in FIG. 1, the parallax barrier 6 is planar along the active area 51. The parallax barrier 6 is separate from the active area 51 by a gap g of a predetermined distance. The parallax barrier 6 may be located opposite to the illuminator 4 from the display panel 5. The parallax barrier 6 may be located between the display panel 5 and the illuminator 4.

Figure 3:
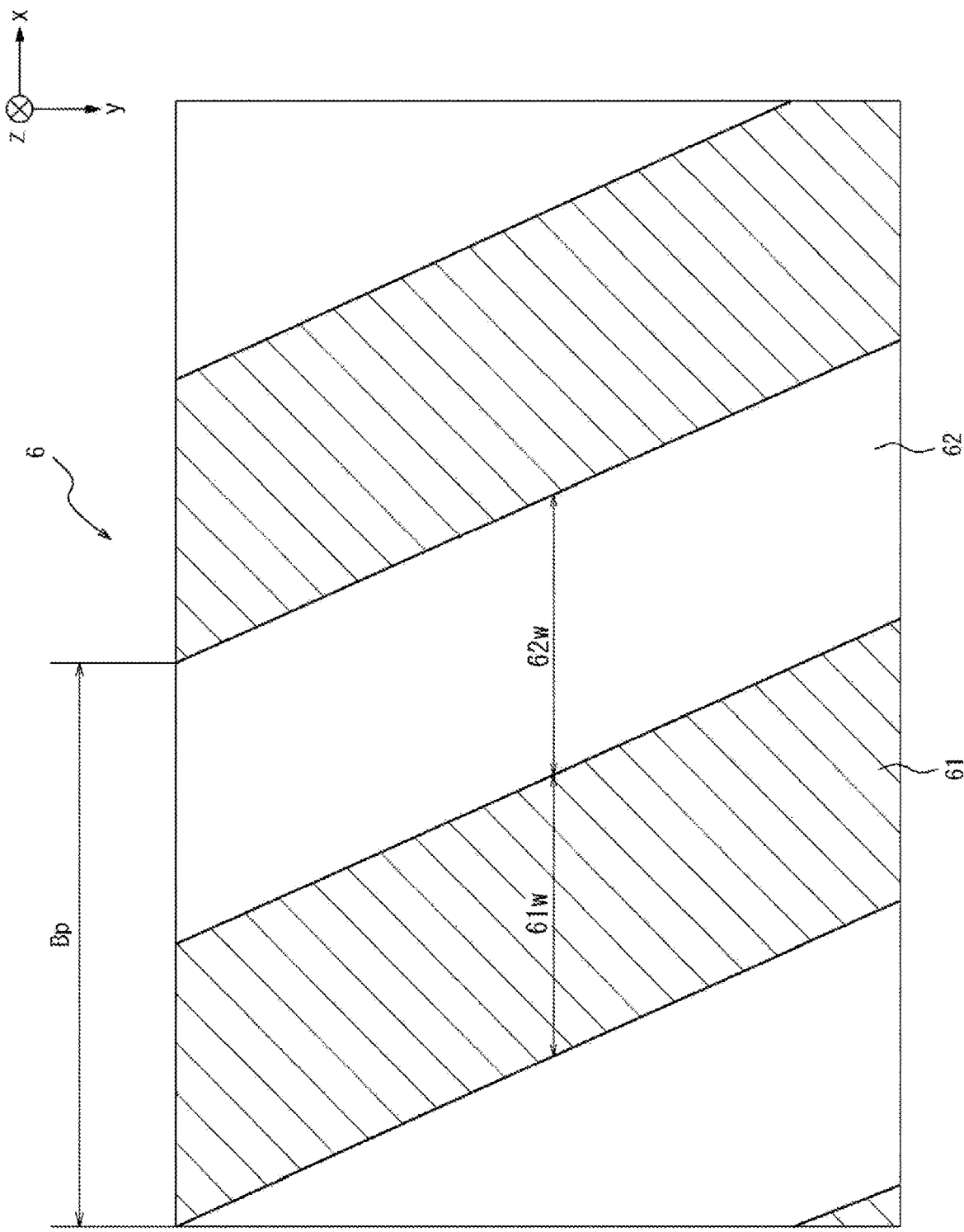
FIG. 3 is a diagram of an example parallax barrier shown in FIG. 1 viewed in the depth direction.

The parallax barrier 6 defines the traveling direction of image light emitted from each of the multiple subpixels. The traveling direction is the direction in which image light travels. The parallax barrier 6 includes multiple less-transmissive portions 61 and multiple transmissive portions 62. As shown in FIG. 3, the transmissive portions 62 are strip areas each elongated in the fourth direction in the plane. The fourth direction is at a predetermined angle other than zero with the vertical direction. The third direction intersects with the first direction and the second direction.

As shown in FIG. 1, the parallax barrier 6 defines the direction of image light emitted from each of the subpixels arranged in the active area 51 to define parts of the active area 51 viewable to the eyes of the user. Areas in the active area 51 emitting image light that reaches the positions of the user's eyes are hereafter referred to as viewable areas 51a. Areas in the active area 51 emitting image light that reaches the position of the user's left eye are hereafter referred to as left viewable areas 51aL (first viewable areas). Areas in the active area 51 emitting image light that reaches the position of the user's right eye are referred to as right viewable areas 51aR (second viewable areas).

More specifically, as shown in FIG. 3, the parallax barrier 6 has multiple less-transmissive portions 61 for reducing image light. The multiple less-transmissive portions 61 define transmissive portions 62 between adjacent less-transmissive portions 61. The less-transmissive portions 61 and the transmissive portions 62 are arranged alternately in the horizontal direction. The width (second width 62w) of each transmissive portion 62 in the horizontal direction can be greater than the width (first width 61w) of each less-transmissive portion 61 in the horizontal direction. The parallax barrier 6 can have an aperture ratio greater than 50%.

The multiple transmissive portions 62 are parts of the parallax barrier 6 to transmit light incident on the parallax barrier 6. The transmissive portions 62 have a higher light transmittance than the less-transmissive portions 61. The less-transmissive portions 61 have a lower light transmittance than the transmissive portions 62. The transmissive portions 62 may transmit light with a transmittance of a first predetermined value or greater. The first predetermined value may be, for example, about 100% or a value less than 100%. The first predetermined value can be a value less than 100%, such as 80% or 50%, when the image light emitted from the active areas 51 falls within the range of good visibility. The less-transmissive portions 61 are parts of the parallax barrier 6 to substantially block light incident on the parallax barrier 6. The less-transmissive portions 61 prevent an image displayed in the active area 51 on the display panel 5 from being viewable to the user's eyes. The less-transmissive portions 61 may transmit light with a transmittance of a second predetermined value or less. The second predetermined value may be, for example, substantially 0% or a greater value close to 0%, such as 0.5%, 1%, or 3%. The first predetermined value can be several times, or for example, 10 times, greater than the second predetermined value. The first predetermined value can be an appropriate known value selected from the range of values that can create contrast with light transmitted through the less-transmissive portions.

The transmissive portions 62 and the less-transmissive portions 61 extend in a predetermined direction along the active area 51. The transmissive portions 62 and the less-transmissive portions 61 can be arranged alternately in a direction orthogonal to the predetermined direction. The transmissive portions 62 define the traveling direction of image light emitted from each of the multiple subpixels.

As shown in FIG. 1, a barrier pitch Bp as an interval at which the transmissive portions 62 are arranged in the horizontal direction and the gap g between the active area 51 and the parallax barrier 6 are determined to satisfy Formula 1 and Formula 2 below using an optimum viewing distance d and a standard distance E0.

$$E0:d = (n \times Hp):g \tag{1}$$

$$d:Bp = (d+g):(2 \times n \times Hp) \tag{2}$$

The optimum viewing distance d is the distance between the user's right eye or left eye and the parallax barrier 6. At the optimum viewing distance d, the horizontal length of each viewable area 51a viewable to each eye is equivalent to n subpixels. The direction of a straight line passing through the right eye and the left eye (interocular direction) corresponds to the horizontal direction. The interocular direction can be different in the physical space. The standard distance E0 is the standard interocular distance E of the user. The standard distance E0 may be, for example, 61.1 to 64.4 mm, as calculated through studies conducted by the National Institute of Advanced Industrial Science and Technology. Hp is the horizontal length of each subpixel as shown in FIG. 2.

The parallax barrier 6 may be formed from a film or a plate with a transmittance less than the second predetermined value. In this case, the less-transmissive portions 61 are parts of the film or plate. The transmissive portions 62 are slits in the film or plate. The film may be formed from resin or another material. The plate may be formed from resin, metal, or another material. The parallax barrier 6 may be formed from a material other than a film or a plate. The parallax barrier 6 may include a base formed from a light-reducing material or a material containing an additive with light reducing properties.

The parallax barrier 6 may include, for example, a liquid crystal shutter. The liquid crystal shutter can control the transmittance of light in accordance with a voltage applied. The liquid crystal shutter may include multiple pixels and control the transmittance of light for each pixel. The liquid crystal shutter can form an area with a high light transmittance or an area with a low light transmittance in an intended shape. The transmissive portions 62 in the parallax barrier 6 including a liquid crystal shutter may have a transmittance of the first predetermined value or greater. The less-transmissive portions 61 in the parallax barrier 6 including a liquid crystal shutter may have a transmittance of the second predetermined value or less.

In this structure, the parallax barrier 6 transmits image light emitted from selected subpixels in the active area 51 through the transmissive portions 62 to reach the user's right eye. The parallax barrier 6 transmits image light emitted from the other subpixels through the transmissive portions 62 to reach the user's left eye. An image viewable to the user when the image light reaches the user's left and right eyes will now be described in detail with reference to FIG. 4.

The left viewable areas 51aL are multiple areas defined on the active area 51 viewable to the left eye of the user. The image light emitted from the subpixels in the left viewable areas 51aL can pass through the transmissive portions 62 of the parallax barrier 6 and reach the left eye of the user. Left unviewable areas 51bL are multiple areas defined on the active area 51 that are not viewable to the left eye of the user. The image light emitted from the subpixels in the left unviewable areas 51bL is blocked by the less-transmissive portions 61 of the parallax barrier 6. The left viewable areas 51aL include half of the subpixels P1, all of the subpixels P2 to P5, half of the subpixels P6, half of the subpixels P7, and half of the subpixels P12.

Figure 4:
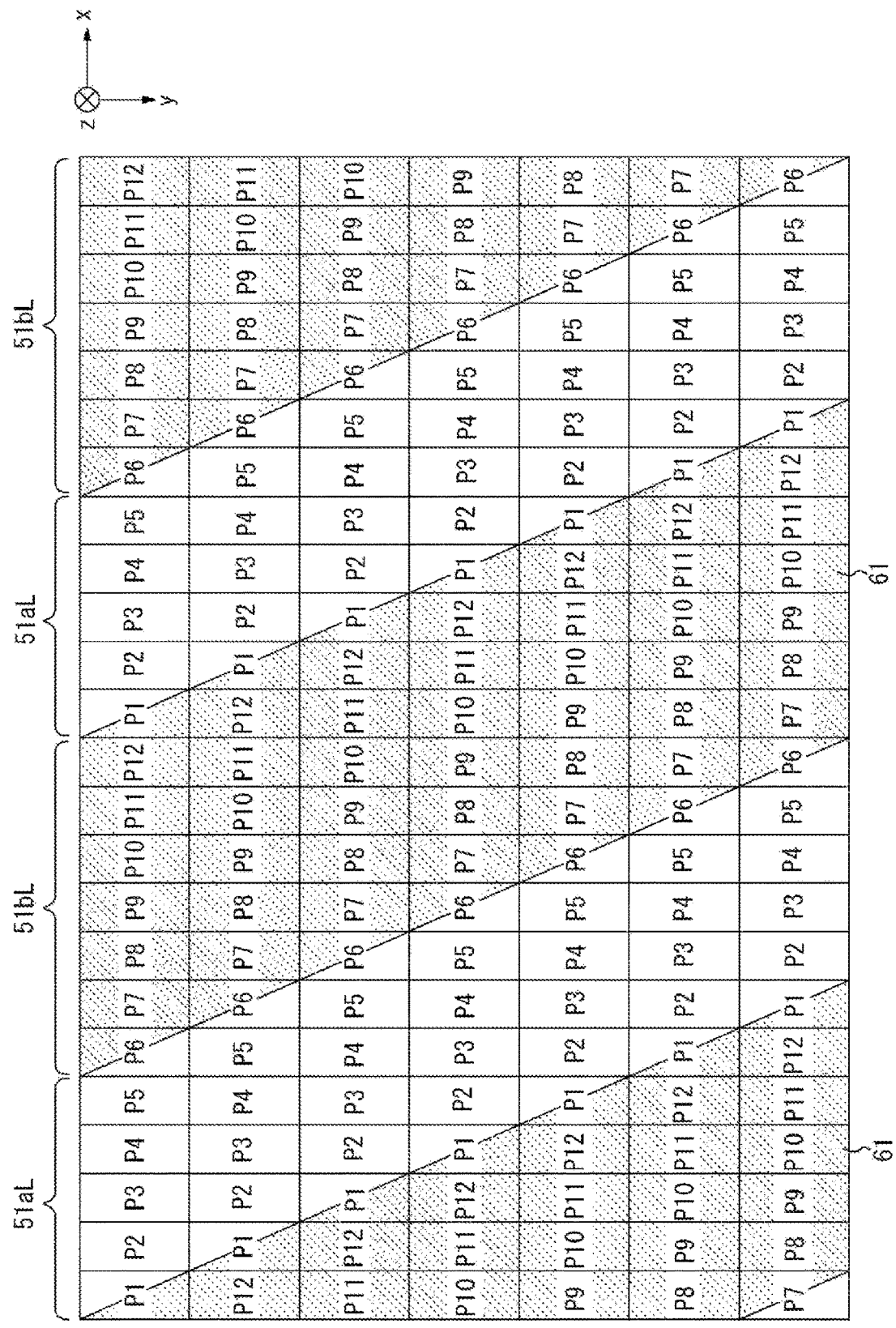
FIG. 4 is a diagram of an example active area on the display panel shown in FIG. 1.

The right viewable areas 51aR shown in FIG. 4 are multiple areas defined on the active area 51 viewable to the right eye of the user. The image light emitted from the subpixels in the right viewable areas 51aR can pass through the transmissive portions 62 of the parallax barrier 6 and reach the right eye of the user. Right unviewable areas 51bR are multiple areas not viewable to the right eye of the user. The image light emitted from the subpixels in the right unviewable areas 51bR is blocked by the less-transmissive portions 61 of the parallax barrier 6. The right viewable areas 51aR include half of the subpixels P1, half of the subpixels P6, half of the subpixels P7, all of the subpixels P8 to P11, and half of the subpixels P1.

Binocular viewable areas 51aLR are the areas of overlap between the left viewable areas 51aL and the right viewable areas 51aR. The image light emitted from the subpixels in the binocular viewable areas 51aLR can pass through the transmissive portions 62 of the parallax barrier 6 and reach the right eye and the left eye of the user. For the user at the optimum viewing distance d, multiple binocular viewable areas 51aLR constantly occur on the parallax barrier 6 with an aperture ratio of 50% or greater. The aperture ratio of the parallax barrier 6 can be calculated using the width of each slit portion 62 relative to the barrier pitch Bp. The width of each binocular viewable area can be smaller than the horizontal length Hp of each subpixel.

The left eye image displayed by the subpixels P1 to P6 and the right eye image displayed by the subpixels P7 to P12 are viewable to the left eye and the right eye. The left eye image and the right eye image are parallax images having parallax between them. The subpixels L display the left eye image. The subpixels R display the right eye image. The subpixels C display a common image that is common to the right eye and the left eye. The common image, which is either the left image or the right eye image, can increase crosstalk.

The controller 7 may be connected to each of the components of the 3D display system 100 to control these components. The components controlled by the controller 7 include the detector 1 and the display panel 5. The controller 7 may be, for example, a processor. The controller 7 may include one or more processors. The processors may include a general-purpose processor that reads a specific program and performs a specific function, and a processor dedicated to specific processing. The dedicated processor may include an application-specific integrated circuit (ASIC). The processor may include a programmable logic device (PLD). The PLD may include a field-programmable gate array (FPGA). The controller 7 may be either a system on a chip (SoC) or be a system in a package (SiP) in which one or more processors cooperate with other components. The controller 7 may include a storage to store various items of information or programs to operate each component of the 3D display system 100. The storage may be, for example, a semiconductor memory. The storage may serve as a work memory for the controller 7.

The memory 8 may include a random-access memory (RAM) or a read-only memory (ROM). The memory 8 stores one or more of a first table, a second table, and a third table, which will be described in detail later. The memory 8 stores one or more of a fourth table, a fifth table, and a sixth table, which will be described in detail later.

The controller 7 can cause a black image as a common image to be displayed in the binocular viewable areas 51aLR. The controller 7 causes a black image to be displayed in each binocular viewable area 51aLR to reduce crosstalk substantially viewable to the user. This structure provides an appropriate 3D image to the user when, for example, the parallax separation allowed by the parallax barrier 6 is incomplete, such as when the aperture ratio is 50% or greater.

The controller 7 can cause a black image to be displayed by two subpixels at the boundaries between the left viewable areas 51aL and the right viewable areas 51aR in one subpixel group Pg. The binocular viewable areas 51aLR occur at the boundaries between the right viewable areas 51aR and the left viewable areas 51aL. The controller 7 can reduce crosstalk substantially viewable to the user.

The controller 7 can cause a black image to be displayed by subpixels on both ends of the right viewable areas 51aR and the left viewable areas 51aL in the horizontal direction. The controller 7 can reduce crosstalk substantially occurring between adjacent subpixel groups Pg.

For the binocular viewable areas each having the length in the horizontal direction smaller than the length Hp of each subpixel in the horizontal direction, a black image displayed in each binocular viewable area can reduce crosstalk caused by light diffraction.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiment or examples may be combined into a structural block, or each structural block may be divided.

Figure 5:
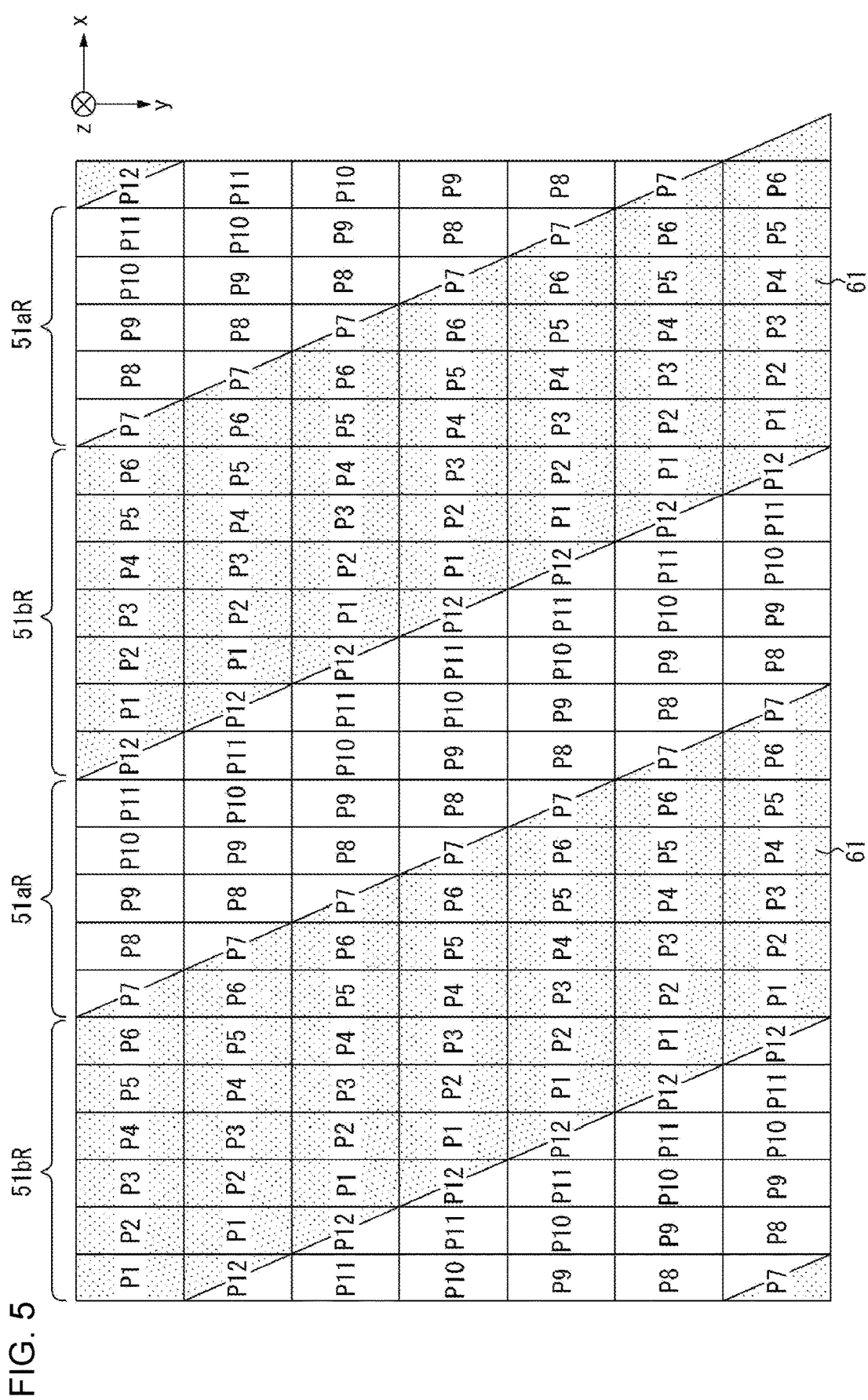
FIG. 5 is a diagram of a head-up display (HUD) incorporating the 3D display system according to the embodiment.

As shown in FIG. 5, the 3D display system 100 may be included in a head-up display system 400. The head-up display system 400 is also referred to as an HUD 400. The HUD 400 includes the 3D display system 100, an optical member 410, and a projection reception member 420 including a projection screen 430. The HUD 400 directs image light from the 3D display system 100 to reach the projection reception member 420 through the optical member 410. The HUD 400 directs image light reflected on the projection reception member 420 to reach the left eye and the right eye of a user. In other words, the HUD 400 directs the image light to travel from the 3D display system 100 to the user's left and right eyes along an optical path 440 indicated by a broken line. The user can thus view image light reaching the eyes along the optical path 440 as a virtual image 450.

Figure 6:
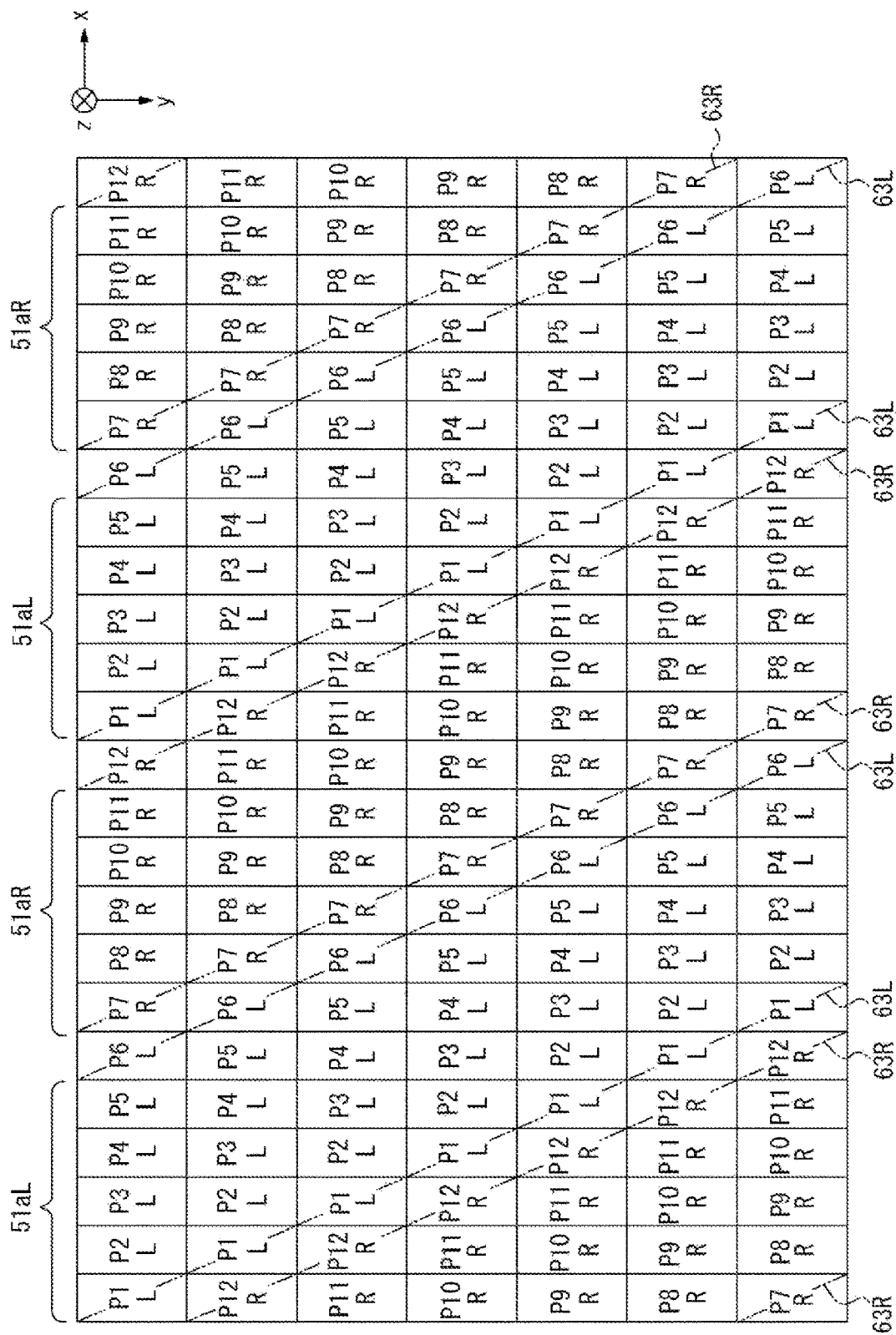
FIG. 6 is a diagram of an example movable object incorporating the HUD shown in FIG. 5.

As shown in FIG. 6, an HUD 400 including a 3D display system 200 may be mounted on a movable object 10. The HUD 400 may include components that also serve as other devices or components included in the movable object 10. For example, the movable object 10 may use a windshield as the projection reception member 420. The devices or components of the movable object 10 serving as devices or components included in the HUD 400 may be referred to as HUD modules or 3D display components. The HUD 400 and the 3D display system 100 may be mounted on the movable object 10. The movable object according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above. For example, the automobile may include an industrial vehicle traveling on a road, and one type of vehicle may fall within a plurality of classes. The vessel according to one or more embodiments of the present disclosure includes a j et ski, a boat, or a tanker. The aircraft according to one or more embodiments of the present disclosure includes a fixed-wing aircraft or a rotary-wing aircraft.

The present disclosure may be implemented in the following forms.

A three-dimensional display device according to one or more embodiments of the present disclosure includes a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to two eyes of a user to allow parallax separation of the parallax image.

A three-dimensional display system according to one or more embodiments of the present disclosure includes a detector that detects a position of a first eye of a user and a position of a second eye of the user different from the first eye, and a three-dimensional display device including a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to the first eye and the second eye of the user to allow parallax separation of the parallax image.

A movable object according to one or more embodiments of the present disclosure includes a three-dimensional display device including a display panel that displays a parallax image, an optical panel including a plurality of less-transmissive portions and a plurality of transmissive portions repeatedly arranged alternately in a parallax direction, and a controller that controls the display panel. Each of the plurality of transmissive portions has a first width in the parallax direction greater than a second width of each of the plurality of less-transmissive portions in the parallax direction. The controller causes the display panel to display a black image in a binocular viewable area on the display panel viewable to two eyes of a user to allow parallax separation of the parallax image.

The 3D display device according to one embodiment of the present disclosure can have larger slits in the parallax barrier.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1 detector
2 three-dimensional (3D) display device
3 obtainer
4 illuminator
5 display panel
6 parallax barrier
7 controller
8 memory
10 movable object
51 active area
51aL left viewable area
51aR right viewable area
51aLR binocular viewable area
61 less-transmissive portion
62 transmissive portion
100 3D display system
400 head-up display (HUD) system
410 optical member
420 projection reception member
430 projection screen
440 optical path
450 virtual image

The invention claimed is:

1. A three-dimensional display device, comprising:
a display panel including an active area including a plurality of subpixels, the active area being configured to display a parallax image;
an optical panel including a plurality of less-transmissive portions and a plurality of transmissive portions, the plurality of less-transmissive portions and the plurality of transmissive portions being repeatedly arranged alternately in a parallax direction; and
a controller configured to control the display panel,
wherein the active area includes first viewable areas which emit image light reaching a first eye of a user, second viewable areas which emit image light reaching a second eye of the user, and binocular viewable areas which emit image light reaching the first and second eyes of the user, each of the plurality of transmissive portions has a first width in the parallax direction greater than a second width of each of the plurality of less-transmissive portions in the parallax direction,
the binocular viewable area has a width in the parallax direction smaller than a width of the subpixel on the display panel viewed from the user at an optimum viewing distance, and
the controller causes a black image to be displayed by subpixels on both ends of the first viewable areas and the second viewable areas in the parallax direction to allow parallax separation of the parallax image.

2. The three-dimensional display device according to claim 1, wherein the controller causes the display panel to display a black image in the first viewable area on the display panel viewable to the first eye of the user and unviewable to the second eye of the user.

3. The three-dimensional display device according to claim 1, wherein the controller causes the display panel to display a black image in the second viewable area on the display panel unviewable to a first eye of the user and viewable to the second eye of the user.

4. A three-dimensional display system, comprising:
a detector configured to detect a position of a first eye of a user and a position of a second eye of the user different from the first eye; and
a three-dimensional display device including
a display panel including an active area including a plurality of subpixels, the active area being configured to display a parallax image,
an optical panel including a plurality of less-transmissive portions and a plurality of transmissive portions, the plurality of less-transmissive portions and the plurality of transmissive portions being repeatedly arranged alternately in a parallax direction, and
a controller configured to control the display panel,
wherein the active area includes first viewable areas which emit image light reaching a first eye of a user, second viewable areas which emit image light reaching a second eye of the user, and binocular viewable areas which emit image light reaching the first and second eyes of the user,
each of the plurality of transmissive portions has a first width in the parallax direction greater than a second width of each of the plurality of less-transmissive portions in the parallax direction,
the binocular viewable area has a width in the parallax direction smaller than a width of the subpixel on the display panel viewed from the user at an optimum viewing distance, and
the controller causes a black image to be displayed by subpixels on both ends of the first viewable areas and the second viewable areas in the parallax direction to allow parallax separation of the parallax image.

5. A movable object, comprising:
a three-dimensional display device including
a display panel including an active area including a plurality of subpixels, the active area being configured to display a parallax image,
an optical panel including a plurality of less-transmissive portions and a plurality of transmissive portions, the plurality of less-transmissive portions and the plurality of transmissive portions being repeatedly arranged alternately in a parallax direction, and
a controller configured to control the display panel,
wherein the active area includes first viewable areas which emit image light reaching a first eye of a user, second viewable areas which emit image light reaching a second eye of the user, and binocular viewable areas which emit image light reaching the first and second eyes of the user,
each of the plurality of transmissive portions has a first width in the parallax direction greater than a second width of each of the plurality of less-transmissive portions in the parallax direction,
the binocular viewable area has a width in the parallax direction smaller than a width of the subpixel on the display panel viewed from the user at an optimum viewing distance, and
the controller causes a black image to be displayed by subpixels on both ends of the first viewable areas and the second viewable areas in the parallax direction to two eyes of a user to allow parallax separation of the parallax image.

* * * * *